Patented Feb. 27, 1923.

1,446,872

UNITED STATES PATENT OFFICE.

BENJAMIN T. BROOKS, OF BAYSIDE, NEW YORK, ASSIGNOR TO CHADELOID CHEMICAL COMPANY, A CORPORATION OF WEST VIRGINIA.

PROCESS OF MAKING ORGANIC OXIDES.

No Drawing. Application filed July 2, 1919. Serial No. 308,070.

*To all whom it may concern:*

Be it known that I, BENJAMIN T. BROOKS, a citizen of the United States, and a resident of Bayside, in the county of Queens, Long Island, and State of New York, have invented certain new and useful Improvements in Processes of Making Organic Oxides, of which contain one or more oxygen atoms This invention relates to the manufacture of organic oxides, that is organic compounds which contain one or more oxygen atoms bound as in the general type compound

in which R and R′, according to the usual conventions of chemical nomenclature, represent the methylene group >CH$_2$ or a derivative or substitution product of this group. Thus ethylene oxide, C$_2$H$_4$O and whose commonly accepted structure is represented as

is the simplest organic oxide. Thus, in this sense ketones and ordinary ethers are not generally considered to be oxides. The oxides referred to in the present invention are chiefly those in which oxygen is considered to be bound to two adjacent carbon atoms, for example propylene oxide and the oxide derived from trimethyl ethylene, the structure of which are considered to be

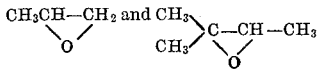

respectively. However in certain cases the oxide produced may not be of this type but oxygen may be attached to two carbon atoms which are not adjacent, as in pinol and cineol.

The oxides are useful and valuable products. Unsaturated hydrocarbons such as olefines may be converted into the corresponding oxides which burn with a less smoky flame. The oxides may be converted into alcohols and also to glycols. Certain oxides are valuable also in organic syntheses.

Heretofore published methods for preparing oxides have mentioned the treatment of a chlorhydrin with a solution of alkali or, since the yields of oxides obtained in this manner by previous workers have been very poor, the reaction of chloro acetin or the like with a caustic alkali solution has been recommended.

If this reaction between a chlorhydrin and a caustic alkali is carried out in the presence of considerable water, very poor yields of oxide result, as described in the chemical literature. Glycols and condensation products of unknown structure are the chief products resulting under these conditions, as for example with a 20 per cent. solution of ethylene chlorhydrin and a 20 per cent. solution of caustic soda a yield of ethylene oxide equivalent to about 12 per cent. of the theory is obtained. If substantially anhydrous chlorhydrins are subjected to the action of solid and substantially dry caustic alkali (this expression of course including lime), excellent yields of the oxides may be obtained. It will be understood in the following description that by the term "caustic alkali" is meant caustic soda, caustic potash, or lime; weaker alkalies are of little or no value in the practice of this invention. Thus from one part by weight of a solution containing 80 per cent ethylene chlorhydrin and 20 per cent water and one part by weight of solid caustic soda there is obtained a yield of ethylene oxide equal to 83 per cent of the maximum theoretically possible. Quick lime or calcium oxide also gives excellent yields, i. e. 70 to 90 per cent of theory when the chlorhydrin is substantially anhydrous.

The process is carried out substantially as follows. A quantity of solid caustic alkali or calcium oxide is placed in an apparatus provided with means for stirring the contents, with an inlet for adding the chlorhydrin and an outlet through which the more volatile oxides may be distilled. The quantity of caustic alkali or lime taken should be in excess, preferably one and one-half to two times the amount theoretically required by the chlorhydrin. The chlorhydrin substantially free from water is then permitted to flow slowly in on the alkali, which is continually stirred to prevent caking and to effect good contact of the chlorhydrin with the alkali. In the case of ethylene, propylene and butylene oxides the heat of the reaction is sufficient to distill the oxides almost as fast as they are formed. For the higher alkylene oxides means for heating should be provided such as a jacket for steam or hot oil. It is important, in order to get the best yields, to remove the oxides as fast as formed since other products are formed by the action of caustic alkali or lime on the oxides in the presence of water or glycol. In the case of the alkylene oxides having eight or more carbon atoms I find it advantageous to carry out the reaction under reduced pressure, to prevent side reactions from occurring. Certain of the more complex chlorhydrins are much more stable in the presence of alkalis than the simpler ones. However in such cases the oxides produced are much more stable than the simpler oxides so that good yields can be obtained from the more complex chlorhydrins also. Thus ethylene, propylene and butylene chlorhydrins react vigorously with caustic alkali or lime at ordinary temperatures. On the other hand most of the chlorhydrins containing eight to twelve carbon atoms, including the hydrocarbons of the terpene class, require several hours heating to 100° to 150° C. to eliminate all the combined chlorine.

Soda lime gives excellent yields of the oxides and a mixture of solid caustic alkali and quick lime gives yields usually better than 80 per cent of the theory. The calcium oxide serves to take up the water formed in the reaction between alkali and a chlorhydrin as indicated by the reactions:

(a) 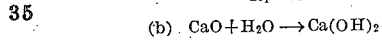

(b) $CaO + H_2O \rightarrow Ca(OH)_2$

It has been stated that the simpler alkylene oxides react with calcium chloride in the presence of moisture to form chlorhydrin and calcium hydroxide. However under the conditions existing in the process as described in the present invention excellent yields are obtained. This may result from the fact that very little water is present or that the lower boiling oxides are removed as fast as formed.

While I have indicated that chlorhydrins containing 20 per cent of water may be employed as also completely anhydrous products I may in some cases use chlorhydrins containing up to about 50 per cent of water. Or in case a chlorhydrin of lower water content is employed in some cases it may be expedient to use aqueous alkali solutions which would tend to dilute the reacting constituent. As a rule I do not wish to have more than 50 per cent of water present and preferably less than 20 per cent, the reaction being carried out to best advantage with materials containing from 20 per cent of water down to entirely anhydrous material.

Oxides prepared in this manner may be used in various ways in the arts as for example as a blending or mixing solvent, to cause liquids normally immiscible to mix. For example gasoline or kerosene do not mix well with ethyl alcohol but the addition of oxides prepared in the foregoing manner, for example from the olefines of cracked petroleum, brings about the desired miscibility.

Another phase of the invention involves the distillation of the oxides as fast as formed in the zone of reaction away from such zone whereby they are removed from any deleterious influences. The invention further comprises any method of removing the oxides as fast as formed in the reaction mass. For example ordinary distillation may serve in some cases whereas in other cases the product is exposed to distillation under a pressure below ordinary atmospheric pressure, 5 to 10 lbs. sub-atmospheric pressure being, for example, employed in some cases. In this phase of the invention both anhydrous chlorhydrins and those containing water in considerable amounts, even in some cases exceeding 50 per cent may be used but best results are obtained with chlorhydrin products having a water content of 20 per cent or less. In like manner while solutions of caustic soda or suspensions of caustic lime containing 50 per cent or more of water may be employed as a reagent, it is preferable in most cases to employ a reagent containing under 50 per cent of water and specifically a product of a substantially anhydrous nature, such as caustic soda, calcium hydrate or oxide.

In the appended claims the term "strong alkali" is intended to include sodium hydroxid, potassium hydroxid, calcium oxid and calcium hydroxid, but not weak alkalies e. g. sodium carbonate, bicarbonate, etc.

The expression "caustic lime" of course, as is usual in the art, embraces both calcium oxid and calcium hydroxid.

What I claim is:—

1. A process of making an organic oxid which comprises reacting upon a chlorhydrin with a strong alkali, at below the boiling point of the chlorhydrin used, while the reacting mixture contains not more than approximately 20% of water.

2. A process of making an alkylene oxid which comprises reacting upon a liquid chlorhydrin with caustic lime, while limiting the amount of water in the reacting mixture to not above approximately 20%, based upon the entire quantity of the reaction mixture.

3. A process of making alkylene oxides which comprises acting upon a liquid chlorhydrin with a strong alkali, in a solid state, the reaction mixture being, at the commencement of the reaction, substantially free from water.

4. A process of making alkylene oxides comprising reacting upon a chlorhydrin at below its boiling point substantially free from water with substantially anhydrous caustic lime.

5. A process of making alkylene oxides which comprises reacting upon a chlorhydrin with a strong alkali in a solid state, and maintaining the water content of the reaction mixture below 20%, maintaining a pressure below atmospheric in the reaction vessel during such treatment, and removing the alkylene oxides from the reaction mass, as fast as produced.

6. The process of making organic oxides which comprises subjecting a chlorhydrin to the action of caustic lime and removing the organic oxides as fast as formed.

7. The process of making an alkylene oxid which comprises subjecting a chlorhydrin to the action of a strong alkali in a solid state and removing the organic oxides as fast as formed.

8. A process of making alkylene oxides which comprises reacting upon chlorhydrins with a strong alkali and distilling the alkylene oxides from the reaction mixture, substantially as fast as formed.

9. The process of making an alkylene oxid which comprises reacting on a liquid chlorhydrin with an alkali under reduced atmospheric pressure and removing the oxid from the zone of reaction as fast as formed.

10. The process of making an alkylene oxid which comprises reacting on a chlorhydrin with quick lime under sub-atmospheric pressure.

11. The process of making an alkylene axid which comprises reacting on a chlorhydrin with a solid alkali under sub-atmospheric pressure.

12. The process of making an alkylene oxid which comprises reacting upon a substantially anhydrous chlorhydrin with a substantially dry reagent of an alkaline nature and removing the alkylene oxid by distillation from the zone of reaction as fast as formed.

13. A process of making alkylene oxids which comprises reacting with a chlorhydrin on a strong alkali in a solid state, in the absence of substantial amounts of water, while distilling off, at below atmospheric pressure, the alkylene oxid substantially as fast as produced.

14. A process of making an alkylene oxid which comprises reacting on a dry chlorhydrin with quick lime and distilling off the organic oxid as fast as formed.

BENJAMIN T. BROOKS.